United States Patent [19]

Koch, II

[11] 4,430,956

[45] Feb. 14, 1984

[54] SPRAY BOOTH WITH UNDEPOSITED COATING MATERIAL COLLECTION SYSTEM

[75] Inventor: Robert L. Koch, II, Evansville, Ind.

[73] Assignee: George Koch Sons, Inc., Evansville, Ind.

[21] Appl. No.: 383,354

[22] Filed: Jun. 1, 1982

[51] Int. Cl.³ .......................................... B05C 15/00
[52] U.S. Cl. ............................ 118/326; 118/DIG. 7; 118/610; 98/115 SB
[58] Field of Search .................. 118/326, DIG. 7, 634, 118/603, 610; 98/115 SB; 55/295, 294, 302, 296; 15/101, 246.5

[56] References Cited

U.S. PATENT DOCUMENTS

| | | | |
|---|---|---|---|
| 2,694,466 | 11/1954 | Bingman | 183/22 |
| 3,190,817 | 6/1965 | Neugebauer et al. | 55/295 X |
| 3,486,309 | 12/1969 | Wild | 55/272 |
| 3,791,341 | 2/1974 | Diamond | 118/7 |
| 3,793,811 | 2/1974 | Bourne | 55/294 |
| 3,814,002 | 6/1974 | Rombach | 98/115 |
| 3,902,455 | 9/1975 | Lehmann et al. | 118/630 |
| 3,905,785 | 9/1975 | Fabre | 55/96 |
| 3,918,641 | 11/1975 | Lehmann et al. | 239/15 |
| 4,303,417 | 12/1981 | Koch | 55/96 |

FOREIGN PATENT DOCUMENTS

| | | |
|---|---|---|
| 649123 | 9/1962 | Canada .................................. 183/28 |
| 828032 | 1/1952 | Fed. Rep. of Germany . |
| 2015383 | 9/1979 | United Kingdom . |
| 2035834 | 6/1980 | United Kingdom . |

OTHER PUBLICATIONS

"Dust Collectors", Torit Division/Donaldson Company, Inc., St. Paul, Minnesota, (1976 and 1977).

*Primary Examiner*—John P. McIntosh
*Attorney, Agent, or Firm*—Barnes & Thornburg

[57] ABSTRACT

A system for applying a coating material to articles comprises a booth having a floor and walls, a coating material dispensing device for depositing coating materials onto the articles, a vent opening in one of the walls, an exhaust system coupled to the vent opening for pulling atmosphere from the booth, one or more filters positioned between the coating material dispensing device and the vent opening for collecting undeposited coating material entrained in the atmosphere being pulled from the booth, a collection opening in the floor for collecting undeposited coating material which falls to the floor, and a sweeping apparatus for sweeping undeposited coating material on the floor into the collection opening. The sweeping apparatus includes two arms rotatably mounted in proximity to the floor, a drive mechanism for rotating the arms in a circular path. The collection opening in the floor is located near the periphery of the circular path. The arms include flexible blades for wiping the floor as the arm is rotated in the circular path so that the undeposited coating material is collected and forced toward the periphery of the circular path and into the collection opening in response to rotation of the arms.

20 Claims, 7 Drawing Figures

SPRAY BOOTH WITH UNDEPOSITED COATING MATERIAL COLLECTION SYSTEM

The present invention relates to systems for spraying a powder coating material onto articles, and more particularly to a sweeping apparatus for collecting coating material which is not deposited onto the articles, but falls to the floor of the spraying system enclosure.

Various spraying systems for applying a powder coating material to articles are well known in the art. Most conventional powder spraying systems include a booth having a floor and walls, a spray gun, and an exhaust system for maintaining a negative atmospheric pressure within the spray booth. These conventional spraying systems also include a filter media for filtering the atmosphere of the spray booth as it is vented to the outside environment.

As the powder coating material is dispensed toward the article, some of it does not adhere to the article. This undeposited coating material falls to the floor of the booth. The floor of many powder spraying systems includes a hopper for collecting this undeposited coating material. Some systems include means for agitating the undeposited coating material to prevent it from clogging the hopper. Some systems also include a conveyor for removing the undeposited coating material. One problem with prior powder spraying systems is that the undeposited coating material accumulates on the booth floor and/or the hopper walls.

In conventional powder spraying systems, undeposited coating material also becomes entrained in the atmosphere which is being drawn through the filter media from within the spray booth. Over a period of time, the filter media becomes clogged and periodically must be replaced. One solution to the clogged filter media problem disclosed in U.S. Pat. No. 4,303,417 is to periodically apply bursts of pressurized air in a reverse direction against the filter media to dislodge the undeposited coating material collected by the filtering media and allow it to fall to the floor of the booth for collection. Thus, undeposited coating material from the filter media also accumulates on the floor of the booth.

The present invention provides a spraying system for applying a powder coating material to articles which includes a booth having a floor, dispensing means for depositing coating material onto articles as they are conveyed through the booth, and a sweeping apparatus for collecting coating material which does not get deposited onto the articles and which falls by gravity to the floor. In one embodiment, the sweeping apparatus includes at least one rotating arm, mounting means for rotatably positioning the arm in proximity to the floor, a driving mechanism for rotating the arm so that it sweeps a defined surface area on the floor, and a collection opening in the floor at the periphery of the defined surface area. The arm provides means for wiping the defined floor area to collect undeposited coating material accumulated on the floor as the arm is rotated. The undeposited coating material collected by the arm is forced toward the periphery of the defined floor area and into the collection opening in response to rotation of the arm.

In an illustrative embodiment of the powder spraying system, the booth includes a vent opening in one of the walls, an exhaust system coupled to the vent opening for pulling atmosphere from within the booth, and one or more filters positioned between the coating material dispensing means and the vent opening for collecting undeposited coating material entrained in the atmosphere being pulled from within the booth. The filters may be either flat filter panels or cylindrical filter cartridges.

The powder spraying system also includes a source of compressed air positioned between an exhaust fan in the exhaust system and the filters for periodically directing a pulse of air through the filters in a reverse direction to dislodge undeposited coating material collected by the filters. The compressed air is directed through double venturi tubes coupled in series to the vent opening.

Other features and advantages of the present invention will become apparent in view of the following detailed description of one embodiment thereof exemplifying the best mode of carrying out the invention as presently perceived, which description should be considered in conjunction with the accompanying drawings. In the drawings.

Figure 1:
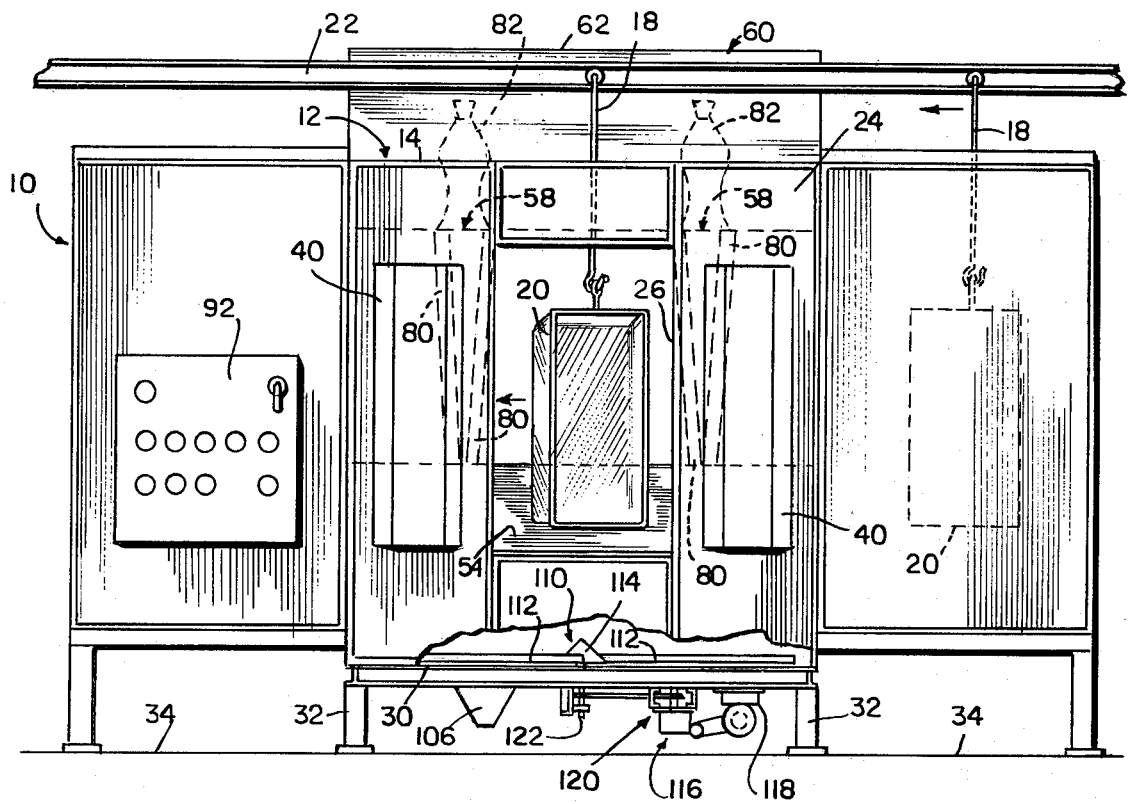
FIG. 1 is a front view, partly broken away, of a powder spray booth embodying the collection system of the present invention.
Figure 2:
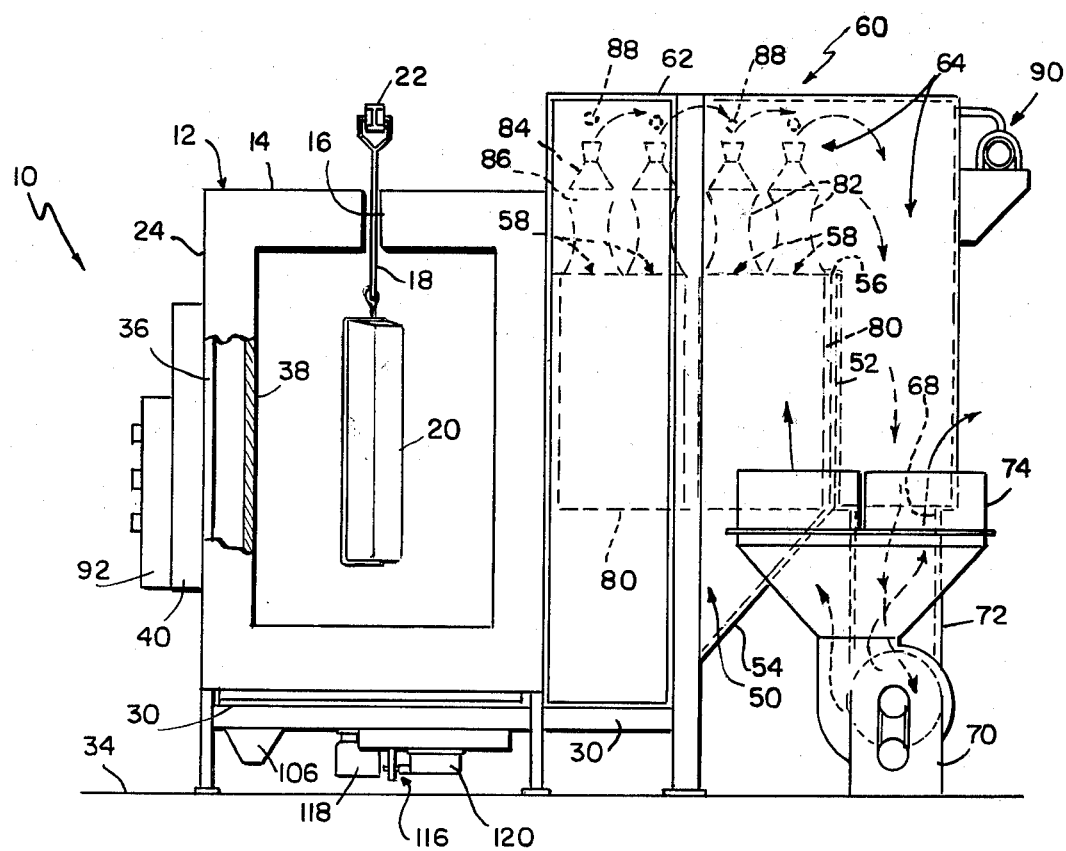
FIG. 2 is an end view, partly broken away and cross-sectioned, of the spray booth and collection system shown in FIG. 1.

Referring to FIGS. 1 and 2, an illustrative embodiment of a powder spraying system 10 for applying a powder coating material to articles is shown embodying the present invention. The spraying system 10 includes a spray booth or enclosure 12 for at least partially enclosing the spraying operations of the system 10. The spray booth 12 has a top wall 14 which includes an elongated slot 16 providing a channel opening for receiving hangers 18 carrying articles 20 to be coated through the booth 12. Hangers 18 are carried on an overhead track or rail 22 and are conveyed along the track to position articles 20 within the booth 12 at spaced intervals.

The front wall 24 of the spray booth 12 includes an opening 26 for a spray gun (not shown) or other dispensing means for dispersing coating material in the direction of the articles 20 as they are conveyed through the spray booth 12. The spray gun or dispensing means may be any conventional means for dispersing a powder coating material so that it will be deposited onto the articles 20. Coating material may be delivered to the spray gun or other dispensing means from a source of coating material.

The bottom or floor 30 of the spray booth 12 is elevated above the ground surface 34 by a plurality of legs 32. The elevation of the floor 30 provides a space for mounting a system for collecting coating material which does not adhere to the articles 20 and which falls to the floor 30 of the spray booth 12. The floor 30 and collection system embodying the present invention will be described in more detail later.

In the illustrative embodiment, the walls 14 and 24 include an outer wall surface 36 and an inner wall surface 38. Further, lights 40 are shown mounted to the outer wall surface 36 of the front wall 24. Lights 40 are provided for assisting the spray gun or other dispensing means operator in viewing the booth 12 and articles 20. It will be appreciated that these features are shown for illustrative purposes only and are not intended to limit the scope of the present invention.

Continuing to refer to FIGS. 1 and 2, the rear of the booth 12 provides a filter chamber 50 having a vertical rear wall section 52 and a downwardly inclined rear wall section 54. The filter chamber 50 also includes a top wall section 56 connected to the top wall 14 to complete the enclosure of the spray booth 12. Pairs of vent openings 58 are provided in the top wall section 56 of the filter chamber 50 for venting atmosphere from within the booth 12. Filter chamber 50 provides an area housing one or more pairs of filters for collecting undeposited coating material entrained in the atmosphere before the atmosphere within the booth 12 is vented to the outside environment.

An exhaust system 60 is mounted to the vertical back wall section 52 and top wall section 56 of the filter chamber 50 for pulling atmosphere within the spray booth 12 to the exterior of the booth 12. Atmosphere within the spray booth 12 is pulled through the vent openings 58 to maintain a negative pressure in the booth 12 and to prevent coating material from drifting outside the booth 12 through the opening 26. The exhaust system 60 includes an exhaust plenum 62 providing an exhaust chamber 64 communicating with the vent openings 58 in the top wall section 56 of the filter chamber 50. The exhaust plenum 62 provides a downwardly facing opening 68. A conventional suction fan or blower 70 is coupled to the opening 68 by a duct member 72. The fan 70 pulls atmosphere from the booth 12 through the vent openings 58 into the exhaust chamber 64 and duct member 72. The atmosphere is finally exhausted through an absolute or final filter media 74 before being released into the outside environment surrounding the booth 12 to reduce the contaminants entrained within the atmosphere pulled from the booth 12. In the illustrative embodiment, the final or absolute filter 74 is positioned after the fan 54 in the exhaust system 60 so that the atmosphere is pulled through the duct work 72 of the exhaust system 60 before passing through the final filter media 74. The flow of atmosphere through the exhaust system 60 is best shown in FIG. 2 by the series of broken line and solid arrows.

One or more pairs of rectangular flat filter panels 80 are mounted within the filter chamber 50 of the booth 12 between the opening 26 and the vent openings 58. As best shown in FIG. 1, pairs of the panels 80 are mounted in the chamber 50 in a V-shaped configuration. One pair of panels 80 is mounted adjacent to each pair of vent openings 58 in the top wall section 56 of the filter chamber 50, as shown in FIG. 2. In the illustrative powder spraying system 10, two or more pairs of filter panels 80 may be used. It will be appreciated that more or less pairs of filter panels 80 may be used without departing from the scope of the present invention. The pairs of panels 80 are mounted so that substantially all atmosphere within the spray booth 12 which is pulled through the plenum 62 and duct work 72 of the exhaust system 60 passes through the filter panels 80 before reaching the plenum 62 and duct work 72. Thus, substantially all undeposited coating material which is entrained in the atmosphere within the spray booth 12 and which has not previously fallen to the floor 30 is collected in the filter panels 80.

The filter panels 80 may be pulse-clean filter panels of the type manufactured by American Air Filter, Louisville, Kentucky. Each illustrative filter panel is generally 2 feet wide and 4 feet long, and has the capability of filtering 1,000 cubic feet per minute of atmosphere. These panels 80 are constructed to permit air flow through the filter media with a minimum amount of resistance. Although pulse-clean filters of the type manufactured by American Air Filter may be used, other rectangular filter panels 80 having similar characteristics can also be used without departing from the scope of the present invention.

Figure 3:
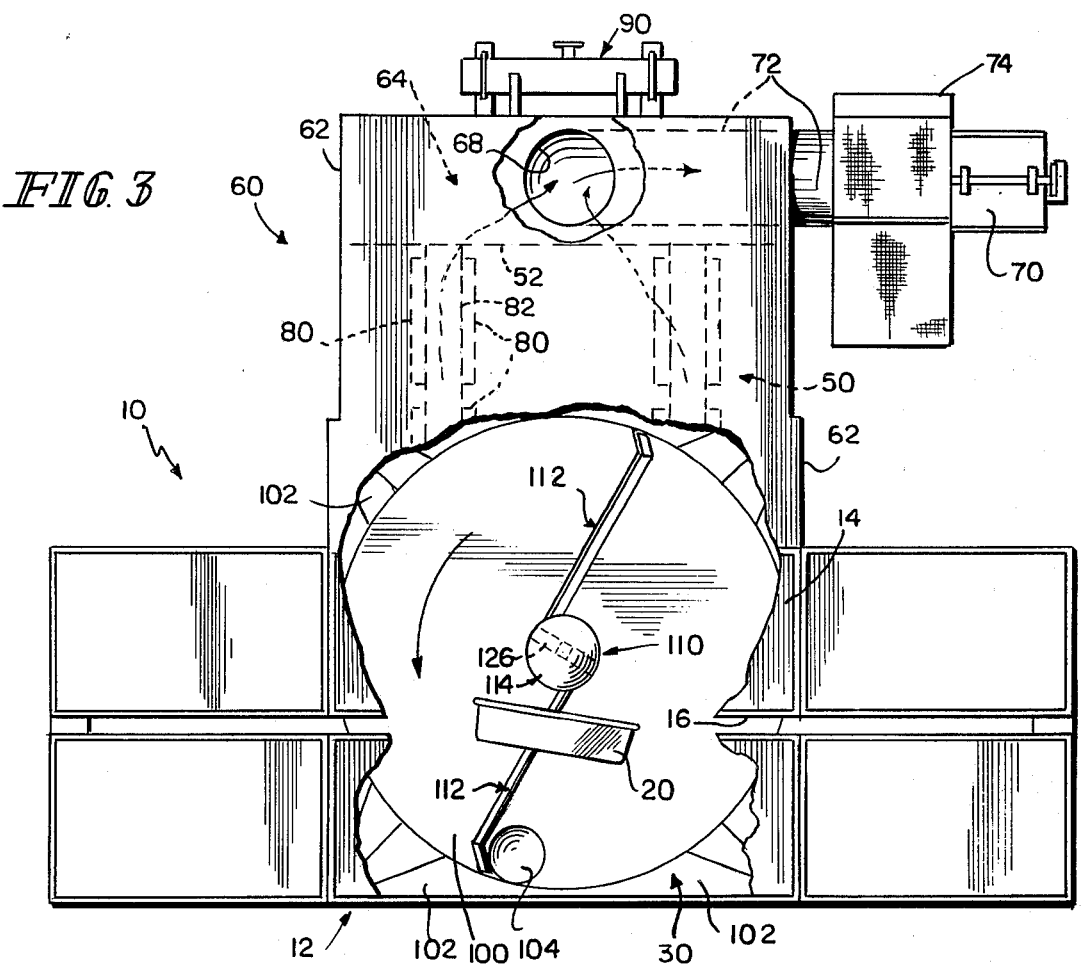
FIG. 3 is a top view, partly broken away, of the spray booth and collection system shown in FIGS. 1 and 2.

A double venturi 82 is mounted within the exhaust plenum 60 between each vent opening 58 and the fan 54. Each double venturi 82 includes a primary venturi tube 84 and a secondary venturi tube 86 connected in series to the top wall section 56 of the filter chamber 50 adjacent a vent opening 58. Pulse air nozzles 88 are located in proximity to each primary venturi tube 84 and are coupled to a compressed air supply manifold 90, as best shown in FIGS. 2 and 3. Valves associated with the air supply manifold 90 are electrically coupled to a control system 92 which may include, for example, a timer for periodically and automatically opening and closing the valves to release a short pulse of air which passes through the double venturis 82 and which is directed toward the pairs of filter panels 80 through the vent openings 58 to dislodge any collected undeposited coating material collected in the panels 80. By periodically self-cleaning the filter panels 80, a substantially constant exhaust flow rate is provided which is sufficient to maintain a negative atmospheric pressure in the spray both 12. It will be appreciated that the length of duration of the air pulses and the time period between successive air pulses will depend upon the number of coating material dispensing means being used in the spraying system and the amount of coating material being collected in the filter panels 80.

Referring to FIGS. 1, 2, and 3, the floor 30 of booth 12 has a flat, generally circular surface area 100. In the illustrative embodiment, the circular surface area 100 has a diameter of approximately 90 inches (228.6 cm). Downwardly sloping sides 102 are provided in the corners of the generally rectangular booth 12. The floor 30 also includes a generally circular collection opening 104 in proximity to the outer periphery of the circular surface area 100. The opening 104 has a frustoconical-shaped hopper 106 connected thereto beneath the floor 30. In the illustrative embodiment, the circular collection opening 104 has a diameter of 14 inches (35.56 cm) and is covered by a screen having 0.125 inch (0.3175 cm) square openings.

The undeposited coating material collection system embodying the present invention includes a powder sweep mechanism for collecting undeposited coating material accumulated on the circular surface area 100 of the floor 30 and sweeping the collected coating material into the collection opening 104 and hopper 106. As best shown in FIG. 3, the sweep mechanism includes two rotating arms 112, a conical-shaped mounting member 114 for mounting the arms in proximity to the surface area 100 of the floor 30, and a drive assembly 116 coupled to the mounting member 114 for rotating the mounting member 114 and arms 112 so that the arms sweep a defined circular path over the surface area 100. As best shown in FIGS. 1 and 2, the drive assembly 116 includes a motor 118, drive linkages 120, and an output shaft 122 interconnecting the drive linkages and the mount 114. In the illustrative embodiment, the conical-shaped mount 114 is made of aluminum and has a base diameter of approximately 18 inches (45.72 cm) and a height of approximately 6 inches (15.24 cm). Arms 112 are connected to the mount 114 by an 18 inch (45.72 cm) long aluminum tubular bracket 126 which is housed within the conical-shaped mount 114. It will be appreciated that other means may be employed for rotatably mounting the arms 112 in proximity to the surface area 100 of the floor 30 and that other drive assemblies may be employed without departing from the scope of the present invention.

Figures 5, 6:
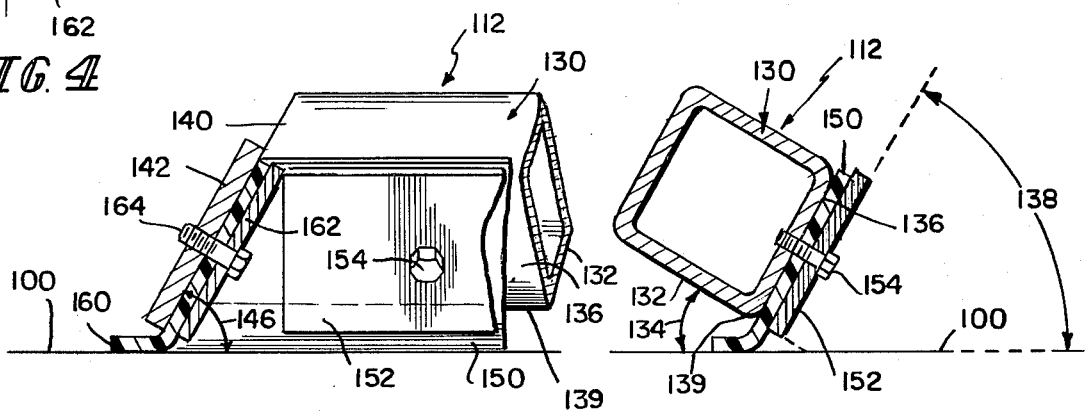
FIG. 5 is a cross-sectional view of the portion of the collection system shown in FIG. 4, taken generally along section lines 5—5 of FIG. 4.
FIG. 6 is a partially cross-sectioned view of the portion of the collection system shown in FIG. 4, taken generally along section lines 6—6 of FIG. 4.

Referring to FIGS. 3, 4, 5, and 6, each rotating arm 112 includes an elongated tubular section 130 which is generally rectangular in cross section, as shown in FIG. 5. Each arm 112 is mounted to the bracket 126 so that one side 132 of the tubular section 130 forms an angle 134 of about 30° with the surface area 100, and an adjacent side 136 of the tubular section 130 forms an angle 138 of about 60° with the surface 100. Further, the arms 112 are mounted so that the corner 139 of the tubular section 130 connecting the adjacent sides 132 and 136 is slightly above the surface area 100. In the illustrative embodiment, the elongated tubular sections 130 are made of aluminum and each has a length of aproximately 41.5 inches (105.41 cm).

A plate 142 is connected to the distal end 140 of each tubular section 130 at an angle 144 of 120° to the tubular section 130. The plate 142 is connected by welding or other means and is canted at an angle 146 of 60° with respect to the surface area 100 of the floor 30. In the illustrative embodiment, the plate 142 is made of aluminum, has a length of 4 inches (10.16 cm), and has a width of 1.75 inches (4.445 cm). Thus, in the illustrative embodiment, the total length 148 of each arm 112 is approximately 43.5 inches (110.49 cm).

Referring more particularly to FIGS. 5 and 6, a flexible wiper blade 150 is connected to side 136 of the tubular section 130 by an elongated aluminum mounting plate 152 and bolts 154. The flexible wiper blade 150 has a sufficient width so that it engages the surface area 100 of the floor 30. A flexible wiper blade 160 is also connected to the plate 142 of each arm 112 by an aluminum mounting plate 162 and bolts 164. The flexible blade 160 also has a sufficient width so that it engages the surface area 100 of the floor 30. It will be appreciated that the blades 150 and 160 may be formed from a continuous piece of flexible material or may be two separate pieces of such material. In the illustrative embodiment, the blades 150 and 160 are fabricated of silicone having a hardness of 50 Shore A durometers. Other flexible materials for wiping or brushing the surface area 100 of the floor 30 could be used without departing from the scope of the present invention.

Figure 4:
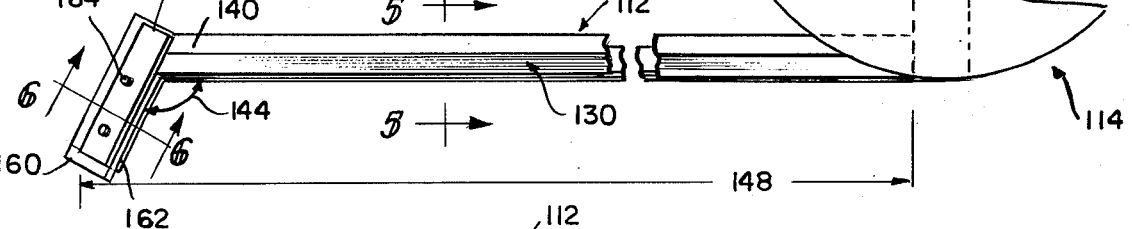
FIG. 4 is a top plan view, partly broken away, of a portion of the collection system shown in FIGS. 1–3.

In operation, powder coating material which does not adhere to the articles 20 falls to the floor 30 of the booth 12 and is channeled onto the surface area 100 by the downwardly sloping sides 102. Additional undeposited coating material collected in the filters 80 and dislodged by the compressed air periodically pulsed in a reverse direction through the filters 80 accumulates on the surface area 100 of the floor 30. Operation of the sweep mechanism 110 is controlled by the control system 92. The sweep mechanism 110 may be operated continuously or periodically as needed. When the sweep mechanism 110 is operating, arms 112 rotate in the direction represented by the arrow in FIG. 3. Undeposited coating material accumulated on the surface area 100 is collected by the brushing or wiping action of the blades 150 and 160. The centrifugal and frictional forces associated with the rotational motion of the arms 112 force the collected undeposited coating material toward the outer periphery of the surface area 100, along the arms 112. The angularly positioned plates 142 at the distal ends 140 of the arms 112 channel the collected coating material which is forced toward the periphery of the surface area 100 into the collection opening 104 in the floor 30 as each arm 112 passes over the opening 104. As best shown in FIG. 4, the blades 160 connected to the plates 142 are slightly longer than the plates 142 so that the blades 160 also sweep along the outer periphery of the surface area 100. The undeposited coating material is collected in hopper 106. The hopper 106 may be coupled to the coating powder supply so that the collected undeposited powder coating material may be reused. The sweeping apparatus embodying the present invention reduces the frequency of cleaning of the floor 30 of the booth 12 and increases the quantity of undeposited coating material which can be collected and reused.

Figure 7:
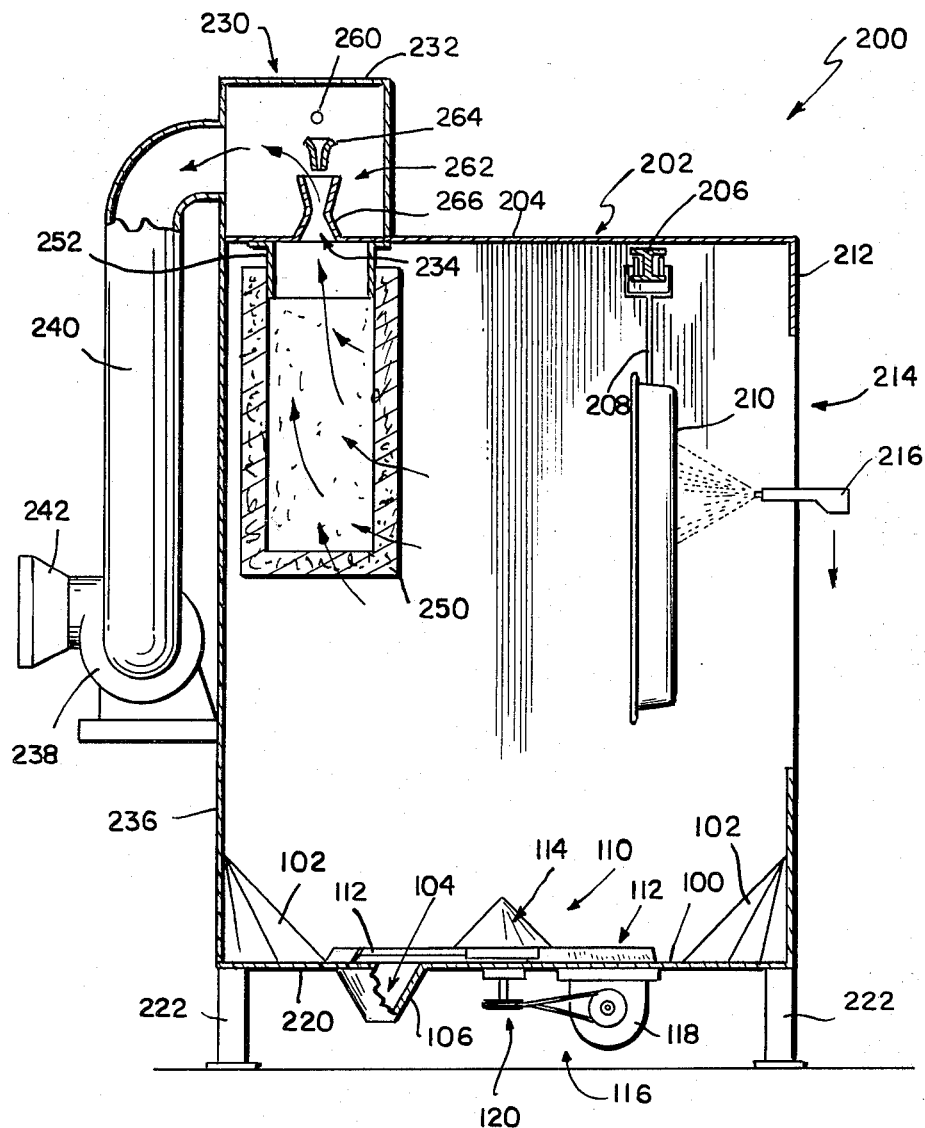
FIG. 7 is an end view, partly broken away and cross-sectioned, of another embodiment of a powder spray booth embodying the collection system of the present invention.

Referring to FIG. 7, another illustrative embodiment of a powder spraying system 200 is shown embodying the present invention. The system 200 includes a spray booth or enclosure 202 for enclosing the spraying operations of the system 200. The spray booth 202 has a top wall 204. An overhead track 206 is mounted to or in proximity to the top wall 204. Hangers 208 carry a plurality of articles 210 to be coated. The articles 210 are conveyed through the spray booth 12 along the track 206 at spaced intervals.

The front wall 212 of the spray booth 202 includes an opening 214 for a spray gun 216. Gun 216 dispenses coating material and disperses it in the direction of the articles 210 so that the coating material is deposited onto the articles 210 as they are conveyed through the spray booth 202.

The floor or bottom wall 220 of the spray booth 202 is elevated above the ground surface by a plurality of legs 222. The floor 220 of booth 202 is constructed in the manner previously described, and the system 200 includes a powder sweep mechanism 110 embodying the present invention. The same reference numerals used to describe the sweep mechanism 110 above are employed to identify the various structural components of the sweep mechanism 110 in the system 200 shown in FIG. 7. The sweep mechanism 110 shown in FIG. 7 operates in the same manner as described above, and thus no further explanation thereof is provided. A back wall 226 completes the enclosure of the booth 202.

An exhaust system 230 for pulling atmosphere from the spray booth 202 to the outside environment is mounted to the top and back walls 204 and 226, respectively, of the spray booth 12. The exhaust system 230 maintains a negative pressure within the spray booth 202 to prevent coating material from drifting outside the booth 202 through the opening 214. The exhaust system 230 includes an exhaust plenum 232 mounted to the top wall 204 of the booth 202 adjacent a vent opening 234 provided in the top wall 204. A conventional suction fan or blower 238 is mounted to the back wall 236 of the booth 202 and is connected to the plenum 232 by a duct member 240. The fan 238 is employed to pull the atmosphere from the spray booth 202 through the vent opening 234 into the plenum 232 and duct member 240. The atmosphere is finally exhausted through an absolute or final filtering media 242 before being released into the outside environment surrounding the booth 202 to reduce the contaminants contained within the atmosphere pulled from the booth 202.

One or more cylindrical filter cartridges 250 are mounted by a mounting bracket 252 in the booth 202 between the opening 214 in the front wall 212 and the vent opening 234 in the top wall 204. The filter cartridge 250 is removably mounted so that the cartridge 250 can be easily changed. The filter cartridge 250 may be of the type manufactured by the Torit Division of Donaldson Company, St. Paul, Minnesota. In one illustrative embodiment, the cartridge 250 is 26 inches (66.04 cm) long, has an outside diameter of 12.75 inches (32.385 cm), and has an inside diameter of 8.375 inches (21.273 cm). In another illustrative embodiment, the cartridge 250 is 16 inches long (40.64 cm), has an outside diamteter of 7.875 inches (20.003 cm), and has an inside diameter of 3.5 inches (8.89 cm). Other cylindrical cartridge filters may be used without departing from the scope of the present invention.

The filter cartridge 250 is mounted so that substantially all atmosphere within the spray booth 202 which is pulled through the plenum 232 duct work 240 of the exhaust system 230 passes through the filter cartridge 250 before reaching the plenum 232 and duct work 240. Thus, substantially all undeposited coating material entrained in the atmosphere which has not previously fallen to the floor 220 of the booth 202 is collected in the filter cartridge 250.

A compressed air supply source and nozzle arrangement 260 is mounted in the exhaust plenum 232 between the vent opening 234 and the fan 238. As described above, the air supply source has controllable valves which may be opened and closed to provide a pulse of air in the direction of the vent opening 234. Interposed between the source of compressed air 260 and the vent opening 234 is a double venturi tube arrangement 262 for each cylindrical filter cartridge 250. The double venturi 262 includes a primary venturi tube 264 located in proximity to the compressed air source 260 and a secondary venturi tube 266 connected to the top wall 204 of the spray booth 212 adjacent the vent opening 234 in series with the first venturi tube 264. The valves associated with the source of compressed air 260 are electrically connected to a control system of the type previously described which may include, for example, a timer for periodically and automatically opening and closing the valves to release a short pulse of air which passes through the venturi 262 and which is directed toward the filter cartridge 250 through the vent opening 234 to dislodge any collected undeposited coating material in the filter cartridges 250. The dislodged coating material is allowed to fall by gravity to the floor 220 of the spray booth where it is swept into the collection hopper 106 by the sweep mechanism 110 in the manner previously described.

What is claimed is:

1. A system for applying a coating material to articles, comprising a booth having top, bottom, and back walls, dispensing means for depositing coating material onto the articles in the booth, one of the top and back walls including a vent opening, an exhaust fan coupled to the vent opening for pulling atmosphere from the booth in a first direction through the vent opening, at least one filter positioned between the dispensing means and the vent opening for collecting undeposited coating material present in the atmosphere being pulled from the booth, filter-cleaning means positioned between the filter and the fan for cleaning the filter, the filter-cleaning means including an air source, at least one venturi tube coupled to the vent opening adjacent the air source for directing a pulse of air through the filter in a second direction to dislodge the collected coating material therefrom and allow it to fall to the bottom wall, the bottom wall including a collection opening for collecting undeposited coating material which falls to the bottom wall, sweeping means for sweeping undeposited coating material on the bottom wall into the collection opening.

2. The system of claim 1 wherein the sweeping means includes at least one arm, mounting means for rotatably positioning the arm in proximity to the bottom wall, and driving means for rotating the arm so that it sweeps a surface area of the bottom wall.

3. The system of claim 2 wherein the collection opening in the bottom wall is at least near the periphery of the surface area swept by the rotating arm.

4. The system of claim 3 wherein the arm provides means for wiping the surface area of the bottom wall as the arm is rotated to collect the undeposited coating material, the collected coating material being moved toward the periphery of the surface area and into the collection opening in response to rotation of the arm.

5. The system of claim 4 wherein the arm includes an elongated tubular section, the arm being mounted so that at least one side of the tubular section forms an acute angle with respect to the bottom wall.

6. The system of claim 5 wherein the arm further includes a plate connected to the distal end of the tubular section, the plate forming an obtuse angle with respect to the tubular section and an acute angle with respect to the bottom wall.

7. The system of claim 6, further comprising at least one flexible blade connected to the tubular section and plate of the arm, the blade having a sufficient width for it to engage and wipe the surface area of the bottom wall in response to rotation of the arm.

8. A system for applying a coating material to articles, comprising a booth having a floor, dispensing means for depositing coating material onto the articles in the booth, undeposited coating material falling by gravity to the floor, and sweeping means for collecting the undeposited coating material which has fallen to the floor, the sweeping means including at least one arm, mounting means for rotatably positioning the arm in proximity to the floor, driving means for rotating the arm in a circular path, a collection opening in the floor at least in proximity to the periphery of the circular path, the arm providing means for sweeping the floor in the circular path to collect the undeposited coating material on the floor as the arm is rotated, the material which is collected being moved toward the periphery of the circular path and into the collection opening in response to rotation of the arm.

9. A system for applying a coating material to articles, comprising a booth having a floor and walls, dispensing means for depositing coating material onto the articles in the booth, the floor including a collection opening for collecting undeposited coating material which falls to the floor, a vent opening in one of the walls, an exhaust system coupled to the vent opening for pulling atmosphere from the booth, at least one filter positioned between the dispensing means and the vent opening for collecting undeposited coating material entrained in the atmosphere being pulled from the booth, and sweeping means for sweeping undeposited coating material on the floor into the collection opening.

10. The system of claim 9 wherein the sweeping means includes at least one arm, mounting means for rotatably positioning the arm in proximity to the floor, and driving means for rotating the arm so that it sweeps a surface area of the floor.

11. The system of claim 10 wherein the collection opening in the floor is at least in proximity to the periphery of the surface area swept by the rotating arm.

12. The system of claim 11 wherein the arm provides means for wiping the surface area of the floor as the arm is rotated to collect the undeposited coating material, the collected coating material being moved toward the periphery of the surface area and into the collection opening in response to rotation of the arm.

13. The system of claim 12 wherein the arm includes an elongated tubular section, the arm being mounted so that at least one side of the tubular section forms an acute angle with respect to the floor.

14. The system of claim 13 wherein the arm further includes a plate connected to the distal end of the tubular section, the plate forming an obtuse angle with respect to the tubular section and an acute angle with respect to the floor.

15. The system of claim 14, further comprising at least one flexible blade connected to the tubular section and plate of the arm, the blade having a sufficient width for it to engage and wipe the surface area of the floor in response to rotation of the arm.

16. A system for applying a coating material to articles, comprising a booth having a floor, dispensing means for depositing coating materials onto the articles in the booth, undeposited coating material falling by gravity to the floor, and sweeping means for collecting material accumulated on the floor, the sweeping means including at least one rotatable arm, mounting means for positioning the arm in proximity to the floor, driving means for rotating the arm so that it sweeps a defined surface area of the floor, a material collection opening in the floor at least in proximity to the periphery of the defined surface area, the arm providing means for wiping the defined surface area to collect the material as the arm is rotated, the material being moved along the arm toward the periphery of the defined surface area and into the collection opening in response to rotation of the arm.

17. The system of claim 16 wherein the arm includes an elongated tubular section, the arm being mounted so that at least one side of the tubular section forms an acute angle with respect to the surface.

18. The system of claim 17 wherein the arm further includes a plate connected to the distal end of the tubular section, the plate forming an obtuse angle with respect to the tubular section and an acute angle with respect to the surface.

19. The system of claim 18, further comprising at least one flexible blade connected to the tubular section and plate of the arm, the blade having a sufficient width for it to engage and wipe the defined surface area in response to rotation of the arm.

20. A system for applying a coating material to articles, comprising a booth having a floor, dispensing means for depositing coated material onto the articles in the booth, undeposited coating material falling by gravity to the floor, and sweeping means for collecting the undeposited coating material which has fallen to the floor, the sweeping means including at least one rotatable arm having an elongated tubular section and a plate connected to the distal end of the tubular section, means for rotatably mounting the arm in proximity to the floor so that at least one side of the tubular section forms an acute angle with respect to the floor, the plate forming an obtuse angle with respect to the tubular section and an acute angle with respect to the floor, driving means for rotating the arm so that it sweeps a defined surface area of the floor, a material collection opening in the floor at least in proximity to the periphery of the defined surface area, and at least one flexible blade connected to the tubular section and plate of the arm, the blade having a sufficient width for it to engage and wipe the defined surface area in response to rotation of the arm so that the material is moved along the arm toward the periphery of the defined surface area and into the collection opening.

* * * * *